United States Patent
Zheng et al.

(10) Patent No.: US 7,399,533 B2
(45) Date of Patent: Jul. 15, 2008

(54) POLYVINYLIDENE FLUORIDE COATING FOR METAL SUBSTRATES

(75) Inventors: Min Zheng, Wilmington, DE (US); Kurt Wood, Abington, PA (US); Scott Gaboury, Blue Bell, PA (US)

(73) Assignee: Arkema Inc., Philadelphia, PA (US)

( * ) Notice: Subject to any disclaimer, the term of this patent is extended or adjusted under 35 U.S.C. 154(b) by 446 days.

(21) Appl. No.: 11/039,979

(22) Filed: Jan. 21, 2005

(65) Prior Publication Data

US 2006/0166004 A1    Jul. 27, 2006

(51) Int. Cl.
- *B32B 1/08* (2006.01)
- *B32B 15/08* (2006.01)
- *B32B 27/26* (2006.01)
- *C08L 27/12* (2006.01)
- *C08L 27/16* (2006.01)

(52) U.S. Cl. .................. 428/626; 428/35.8; 428/36.91; 428/413; 428/418; 428/421; 428/522; 525/108; 525/121

(58) Field of Classification Search ............... 428/35.8, 428/36.91, 413, 417, 418, 421, 522, 626; 525/108, 113, 119, 121
See application file for complete search history.

(56) References Cited

U.S. PATENT DOCUMENTS

| | | | |
|---|---|---|---|
| 3,324,069 A | 6/1967 | Koblitz et al. |
| 4,356,284 A | 10/1982 | Kutnyak et al. |
| 4,379,885 A | 4/1983 | Miller et al. |
| 4,659,768 A | 4/1987 | Tortorello et al. |
| 4,684,677 A | 8/1987 | Higginbotham et al. |
| 5,130,201 A | 7/1992 | Yoshimura et al. |
| 6,500,565 B2 | 12/2002 | Usui |
| 2002/0090528 A1 | 7/2002 | Usui |

FOREIGN PATENT DOCUMENTS

JP    2003194288 A    7/2003

*Primary Examiner*—Ramsey Zacharia
(74) *Attorney, Agent, or Firm*—Thomas F. Roland

(57) ABSTRACT

The invention relates to a one-step fluoropolymer, especially polyvinylidene fluoride (PVDF), coating for use on metals, especially use on metal fuel line and brake tubes, etc, to provide a protective barrier with superior chemical resistance, impact resistance and heat resistance as well as good flexibility. The coating composition contains, on a resin solids basis, 75-94 percent polyvinylidene fluoride resin, 5-20 percent acrylic resin, and 1-15 percent polyepoxide resin. The coating has excellent adhesion on metal substrates, particularly on non-pretreated galvanized steel, without the need for a primer coating.

11 Claims, No Drawings

POLYVINYLIDENE FLUORIDE COATING FOR METAL SUBSTRATES

FIELD OF THE INVENTION

The invention relates to a one-step fluoropolymer, especially polyvinylidene fluoride (PVDF), coating for use on metals, especially use on metal fuel line and brake tubes, etc, to provide a protective barrier with superior chemical resistance, impact resistance and heat resistance as well as good flexibility. The coating composition contains, on a resin solids basis, 75-94 percent polyvinylidene fluoride resin, 5-20 percent acrylic resin, and 1-15 percent polyepoxide resin. The coating has excellent adhesion on metal substrates, particularly on non-pretreated galvanized steel, without the need for a primer coating.

BACKGROUND OF THE INVENTION

Metal tubes such as brake tubes and metal fuel lines are required to have chemical resistance, salt spray corrosion resistance, impact resistance as well as heat resistance. Protective coatings are generally applied to the metal which are capable of withstanding chemical erosion and mechanical erosion.

Fluorocarbon-based resins are known to provide excellent protection to metals, as well as imparting a durable and aesthetic appearance. Unfortunately, the resins themselves adhere very poorly to metal substrates.

One method for increasing adhesion of a fluorocarbon-based coating to a metal is to apply a primer coating or other surface treatment, which improves the adhesion of the topcoat to the substrate and also improves the corrosion resistance of the substrate. U.S. Pat. No. 6,500,565 and US 2002/0090528 disclose a multilayer corrosion resistant PVDF coating for automobile brake tubes. The metal substrate is surface treated with a zinc or zinc-nickel plating layer and a chromate film of trivalent chromium, and was primed with an epoxy layer. U.S. Pat. No. 4,379,885 discloses an acrylic based coating composition especially useful as a primer for metal substrates.

The problem with these methods for providing a PVDF coating is that they involve two steps to ensure good adhesion of the PVDF film—an undercoating followed by the PVDF coating, which adds the expense and complexity of an added manufacturing step.

A one-step polyvinylidene coating for metal surfaces is described in U.S. Pat. No. 5,130,201. A very wide range (10 to 95%) of vinylidene fluoride and a very wide range (1 to 80%) of a poorly compatible resin, such as an epoxy resin, is described. A maximum of 70% PVDF resin and a 7.5% minimum of a curing agent is exemplified.

The problem with the one-step coating of the '201 reference is that it sacrifices some of the protective properties of the coating by teaching lower levels of PVDF in the coating, and it also describes a highly cross-linked system with little flexibility, that can result in cracking of the coating.

There is a need for a one-step coating having good adhesion, excellent chemical resistance such as brake fluid resistance, excellent protective properties, and flexibility for coating metal substrates, especially in applications such as for metal fuel lines and brake tubes.

Surprisingly it has been found that a fluoropolymer coating having good adhesion, superior chemical resistance, impact resistance, corrosion resistance, abrasion resistance, heat resistance and good flexibility, can be formed from a composition having greater than 75% fluoropolymer, 5-20% of an acrylic resin, 1-15% of a polyepoxide resin, and low level of crosslinking. This coating provides the properties required for metal fuel lines and brake tubes. An additional advantage is that brake tubes coated with the composition of the invention have excellent brake fluid resistance.

SUMMARY OF THE INVENTION

It is accordingly a first objective of the invention to produce a fluoropolymer coating having good adhesion to metal substrates.

It is a second objective of the invention to produce a fluoropolymer coating having a high level of fluoropolymer, for excellent chemical, impact, corrosion, abrasion and heat resistance.

It is a third objective of the invention to produce a fluoropolymer composition that provides a flexible coating for use in metal fuel lines and brake tubes.

It is a forth objective to produce a coated substrate, coated with a fluoropolymer composition by a one-step process.

These objectives of the invention are accomplished, in accordance with the principles of a preferred embodiment of the invention, by a composition comprising:

a) from 75 to 94 percent by weight of a fluoropolymer resin;

b) from 5 to 20 percent by weight of at least one acrylic resin;

c) from 1 to 15 percent by weight of at least one epoxide resin; and d) optionally up to 5 percent by weight of a crosslinker, all percentages based on a resins solids basis.

The objectives are further accomplished by a process for coating a substrate comprising the steps of: forming the coating composition of the first objective; applying the coating composition to at least one surface of a substrate; and curing the coated surface at a temperature of at least 180° C.

DETAILED DESCRIPTION OF THE INVENTION

The invention relates to a one-step fluoropolymer coating having a high level of a fluoropolymer, which provides a flexible coating having excellent chemical, physical and heat resistance.

The coating composition of the invention contains from 75 to 94 weight percent of one or more a fluoropolymer resins, based on the total resin solids. Preferably the coating contains from 80 to 90 percent of a fluoropolymer, and most preferably from 82 to 88 percent fluoropolymer.

It was found that lower levels of fluoropolymer resins produced a coating having poorer chemical resistance. Higher levels of fluoropolymer resins have an adverse effect on adhesion to metal substrates.

By "fluoropolymer resin" is meant any fluoropolymer that is film-forming. These may be homopolymers, such as polyvinylidene fluoride, or copolymers, such as, but not limited to, vinylidene fluoride/hexafluoropropylene copolymer, vinylidene fluoride/chlorotetrafluoroethylene copolymer, vinylidene fluoride/tetrafluoroethylene copolymer ethylene/tetrafluoroethylene copolymer, fluorinated ethylene propylene (FEP) and mixtures thereof. Fluoropolymers of the invention also include partially fluorinated polymers, such as ETFE and ECTFE, which may have similar decomposition products as fully fluorinated polymers.

Preferably the fluoropolymer is a polyvinylidene fluoride polymer. "PVDF" or PVDF resin or PVDF polymer refers not only to homopolymers of PVDF but also to copolymers prepared from at least about 75% by weight of vinylidene fluoride (VDF) monomer. Comonomers may include other fluorinated monomers such as: hexafluoropropylene (HFP), chlorotetrafluoroethylene (CTFE), tetrafluoroethylene (TFE), and vinyl fluoride.

The film forming fluoropolymer resin typically includes PVDF having a Mw of about 150,000 to about 450,000 and a melting point of about 150-170° C. One example of a commercially available PVDF, which is particularly suitable for use in the present composition, is KYNAR® 301F (available form ARKEMA Inc.).

The coating composition also contains from 5 to 20 weight percent, and preferably 5 to 15 percent, based on the total resin solids, of a thermoplastic acrylic. The acrylic resin must be thermodynamically miscible with the fluoropolymer. Useful acrylic resins include, but are not limited to, polymers and copolymers made from methyl methacrylate, methyl acrylate, and ethyl acrylate monomers. The acrylic resin is needed when the fluoropolymer is polyvinylidene fluoride in order to add some degree of functionality and therefore wetability and adhesion to the coating composition. Other resins may also be used in the composition in small amounts, such as, for example, hydroxyl-functional polymer.

The coating composition also contains at least one polyepoxide resin. The polyepoxide resin is any compound or mixture of compounds having a plurality of 1,2-epoxy groups. The preferred polyepoxides have a molecular weight of from about 150 to about 5000. A preferred class of polyepoxides are the polyglycidyl ethers of polyphenols. One example of a commercially available polyepoxide resin, which is particularly suitable for use in the present composition, is EPON 1001 (available form Resoution Performance Products). Cycloaliphatic epoxy resins are also useful herein. The epoxy resin is present at from 1 to 15 percent by weight, based on the total resin, and preferably from 2 to 10 percent by weight. If the epoxy resin content is less than 1 percent by weight, the coating adhesion will be negatively affected. If it is more than 15 weight percnt, the brake fluid chemical resistance and coating flexibility will be negatively affected. It is also possible to use other polymers having functional groups and capable of forming crosslinks, with or instead of the polyepoxide, such as phenolic resins, organosilanes, and other known crosslink formers.

Optionally a curing agent or crosslinking agent is also present in the coating composition. The curing agent is needed for the coating composition to have good brake fluid resistance, when the polyepoxide resin is used at more than 3 weight percent. The curing agent is present at from 20 to 30 weight percent based on the epoxy resin weight, and preferably about 25 percent by weight; or 0.2 to 5 percent by weight based on the total resin solids. The curing agent is not required when polyepoxide resin is in the range of 1 to 3 weight percent on total resin. Curing agents useful in the present invention include, but are not limited to melamine, isocyanate, blocked isocyanate, phenol resin, amino resin, and other known curing agents. Optionally, catalysts may also be added to accelerate the speed of the reaction of the curing agent. The particular catalysts which are effective for different curing agents are known in the art.

The coating composition may contain other adjuncts as known in the art. The adjuncts include, but are not limited to, pigments, dyes, fillers, anti-settling agents, leveling agents, surfactants, dispersing agents, and thickeners.

The coating composition of the present invention may be prepared by conventional methods. For example, the coating composition may be prepared by blending the various components using a disperser and milling equipment such as a small media mill or paint shaker.

The coating composition may be used as a powder, dissolved in a solvent to form a solution, or dispersed in a solvent or combination of solvents to form a solvent dispersion. Suitable solvents useful as a carrier for solvent dispersions are those which do not dissolve or swell PVDF at room temperature, but will solvate PVDF at elevated temperatures. Suitable solvents include, but are not limited to, the higher ketones such as isophorone, methyl ethyl ketone, methyl isobutyl ketone, etc, glycol ethers such as dipropylene glycol methyl ether, dipropylene glycol dimethyl ether, propylene glycol n-propyl ether, diethylene glycol butyl ether, etc, glycol ether esters such as diethylene glycol ethyl ether acetate, propylene glycol methyl ether acetate, etc., and other esters such as dimethyl phthalate and glyceryl triacetate.

The coating composition of the present invention may be used for coating metal substrates and other substrates exposed to the environment. Examples of metals that can be coated with the coating of the invention include, but are not limited to, iron, stainless steel, copper, aluminum, GALVALUME®, ZINCALUME®, and both pretreated and non-pretreated galvanized steel. Optionally, metal substrates may be pretreated with an inorganic pretreatment, or primer, such as a hexavalent chromium pretreatment, a trivalent chromium pretreatment, an iron phosphate pretreatment, etc. Other substrates that can benefit from being protected with the coating composition of the invention include substrates capable of withstanding the baking process, such as, but not limited to, ceramics, marble, glass, china, and brick.

In one embodiment the substrate consists of brake tubes or metal fuel lines. The coating composition may be applied to the substrate surface using a variety of well-known techniques such as spraying, brushing, electrostatic coating, dipping and roll coating. The fluoropolymer film is then cured to form a coated substrate having an adhered polymer film. The baking temperatures are not critical, but must be high enough to cause the fluoropolymer particles present in the dispersion to coalesce into a continuous film. A temperature of at least about 180° C. for about 10 minutes is generally adequate for spray coatings based on vinylidene difluoride homopolymers. In roll or dipping coating processes, the oven dwell temperature is often no more than about 50 seconds and oven temperatures as high as 350° C. may be used. Vinylidene difluoride-based films are preferably cured by baking for a well time of about 30-60 seconds such that the metal substrate reaches a peak metal temperature of 225° C. to 260° C.

Substrates coated with the composition of the invention have good adhesion on the substrates, superior chemical resistance, impact resistance, corrosion resistance, abrasion resistance, heat resistance and good flexibility.

EXAMPLES

The following examples are intended to illustrate further various aspects of the present invention, but are not intended to limit the scope of the invention in any aspect.

Raw Materials:
  PVDF: Polyvinylidene Fluoride, available from Arkema Inc. as KYNAR® 301F PVDF.
  PARALOID Acrylic B44: Methyl methacrylate-ethyl acrylate copolymer, available from Rohm and Haas, supplied as a 40 wt % solution in toluene
  EPON 1001: a Bisphenol A-based epoxy resin, available from Resolution Performance Products, supplied as a 75 wt % solution in toluene.
  CYMEL 303: a modified melamine-formaldehyde resin, available from Cytec Industries Inc.

NACURE 2500: a p-Toluenesulfonic acid catalyst, available from King Industrues

Test Method:

Paint viscosity was tested using a 4 DIN viscosity cup. Color was read using a HunterLab Labscan II; Geometry 0/45. The color reading is CIE L*a*b*, 10 degree observer, D65 illuminant. Gloss was read using a HunterLab ProGloss 3 (Geometry 85°). Flexibility (T-Bend formability) was measured according to ASTM D 4145-83 Standard Test Method for Coating Flexibility of Prepainted Sheet. Impact resistance was measured according to ASTM D 2794-90 Standard Test Method for Resistance of Organic Coatings to the Effects of Rapid Deformation (Impact). If there is no cracking and it keeps 100% adhesion at 4.5 mm deformation, it passes. Otherwise, it fails. The pencil test is done with a Turquoise pencil according to ASTM D 3363-92a "Standard Test Method for Film Hardness by Pencil Test". brand. The surface hardness is defined by the hardest pencil grade that fails to scratch the film.

Cross hatch adhesion (ASTM D 3359-90) was tested using Gardco Paint Adhesion Test Kit. 0-5 grade (worst to best) was used to compare the adhesion. 5 is 100% adhesion pass. 4 is more than 90% but less than 100% adhesion pass. 3 is more than 60% but less than 90% adhesion pass. 2 is more than 30% but less than 60% adhesion pass. 1 is more than 0 but less than 30% adhesion pass. 0 is 0% adhesion pass.

Thermal stability: coating samples were placed in oven at 150° C. for 24 hours. The color and pencil hardness (ASTM D3363-92a) before and after the heating were measured. If color change CIELAB ΔE*<5 and if there is not a decrease in pencil hardness, it passes. Otherwise, it fails.

Brake fluid (DOT 3) and gasoline chemical resistance test: place brake fluid or gasoline drops on coating surface and cover it with a watch glass for 72 hrs at room temperature. The pencil hardness (ASTM D3363-92a) before and after was measured. If there is no change in pencil hardness, it passes.

Working Example 1-6 and Comparative Example 1-7

The ingredients in Table 1 below were blended and shaken 1 hour on a paint shaker. The resulting paints were then cast on both chromated ($Cr^{+6}$) aluminum AA3003 panels and non-pretreated galvanized steel substrates using wire-wrapped draw down rods (#52). The steel tube samples were made using brush coating. The resulting films, tubes and panels were baked at 585° F. for 50 seconds and then quenched with cold water. Films were then tested for physical and mechanical properties, with the results in Table 2.

TABLE 1

| | Working Examples | | | | | | Comparative Examples | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| PVDF | 55.7 | 63.7 | 66 | 63.7 | 80 | 75 | 57 | 63.7 | 66 | 63.7 | 50 | 70 | 70 |
| Paqraloid B44 (40% in toluene) | 25 | 18.7 | 20.6 | 9.4 | 12.5 | 37.5 | 25 | 18.7 | 20.6 | 9.4 | 25 | 50.5 | 25 |
| Epon 1001 (75% in toluene) | 1.8 | 3.3 | 11.1 | 6.7 | 10 | 13.5 | — | 3.3 | 11.1 | 6.7 | 53 | 13.5 | 27 |
| Chrome oxide pigment | 7.4 | 8.3 | 9.0 | 8.3 | 11 | 11 | 7.4 | 8.3 | 9.0 | 8.3 | 11 | 11 | 11 |
| Carbon black pigment | 0.4 | 0.8 | 0.9 | 0.8 | 1 | 1 | 0.4 | 0.8 | 0.9 | 0.8 | 1 | 1 | 1 |
| Isophorone | 90.4 | 96.5 | 96 | 82.6 | 94.5 | 113 | 91 | 96.5 | 96 | 82.6 | 112 | 108 | 116 |
| Diethylene glycol ethyl ether acetate | 39.3 | 38.7 | 41.4 | 33.5 | 41 | 48 | 39.2 | 38.7 | 41.4 | 33.5 | 48 | 46 | 50 |
| CYMEL 303 | — | 0.6 | 2.1 | 1.3 | 1.9 | 2.5 | — | — | — | — | 10 | 2.5 | 5.0 |
| NACURE 2500 | — | 0.2 | 0.5 | 0.3 | 0.5 | 0.7 | — | — | — | — | 3.0 | 0.7 | 1.5 |
| PVDF on total resin solids, % | 83 | 85 | 80 | 85 | 90 | 75 | 85 | 85 | 80 | 85 | 50 | 70 | 70 |
| Acrylic on total resin solids, % | 15 | 10 | 10 | 5 | 5 | 15 | 15 | 10 | 10 | 5 | 10 | 20 | 10 |
| Epoxy on total resin solids, % | 2 | 5 | 10 | 10 | 5 | 10 | 0 | 5 | 10 | 10 | 40 | 10 | 20 |

TABLE 2

| | | Working Examples | | | | | | Comparative Examples | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Viscosity, 4DIN | | 19.5 | 21 | 24 | 21 | 19 | 21 | 21 | 20.5 | 23 | 19.5 | 17 | 23 | 20 |
| Flexibility, T-bend | | 0 | 0 | 0 | 0 | 0 | 0 | 0 | 0 | 0 | 0 | 4T | 0 | 0 |
| Gloss (85°) | | 81 | 72 | 72 | 72 | 71 | 76 | 79 | 74.1 | 77 | 77.5 | 79 | 78 | 76 |
| Themal Stability (150° C., 24 Hr) | | pass | pass | pass | pass | pass | pass | pass | pass | pass | pass | NA | NA | NA |
| Impact Resistance | | pass | pass | pass | pass | pass | pass | pass | pass | pass | pass | fail | pass | pass |
| Cross Hatch Adhesion | chromated aluminum | 5 | 5 | 5 | 5 | 5 | 5 | 4 | 5 | 5 | 5 | 5 | 5 | 5 |
| | Non-pretreated galvanizd steel | 5 | 5 | 5 | 5 | 5 | 5 | 2 | 5 | 5 | 5 | 5 | 5 | 5 |

TABLE 2-continued

|  |  | Working Examples | | | | | | Comparative Examples | | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 | 7 |
| Brake fluid (drop test 72 h) | Pencil hardness before | H | H | H | H | 2H | H | F | H | H | H | HB | F | F |
|  | Pencil hardness after | H | H | H | H | 2H | H | F | 5B | 3B | 3B | 3B | HB | 2B |
| Gasoline (drop test 72 h) | Pencil hardness before | H | H | H | H | 2H | H | F | H | H | H | HB | F | F |
|  | Pencil hardness after | H | H | H | H | 2H | H | F | H | H | H | HB | F | F |

* 5: 100% adhesion pass; 4: 90% < adhesion < 100%; 3: 60% < adhesion < 90%; 2: 30% < adhesion < 60%; 1: 0% < adhesion < 30%; 0: 0% adhesion.

As seen from the results of working examples and comparative examples, the incorporation of a small amount of polyepoxide co-resin brought in a significant improvement in adhesion, particularly on non-pretreated galvanized steel (working examples 1-6 vs comparative example 1). Higher level of polyepoxide resin might result in a poorer brake fluid resistance. However, a much better brake fluid resistance could be achieved by using a melamine crosslinker (working examples 2-4 vs comparative examples 2-4). However, when the PVDF content is lower than 75%, even with the use of melamine crosslinker agent, the brake fluid resistance is not good (comparative examples 5, 6 & 7). Using a blend of PVDF (75-90%), acrylic (5-20%) and polyepoxide resin (1-15%) with melamine crosslinker, the formulations have a very good adhesion on both chromated aluminum and non-pretreated galvanized steel substrates. Articles coated with this compositions have superior impact resistance, chemical resistance, flexibility and heat resistance as well.

What is claimed is:

1. A coating composition for metal substrates comprising:
    a) from 75 to 94 percent by weight of at least one fluoropolymer resin;
    b) from 5 to 20 percent by weight of at least one acrylic resin;
    c) from 1 to 15 percent by weight of at least one epoxide resin; and
    d) from 0.2 to 5 percent by weight of at least one curing agent, wherein said curing agent comprises a melamine,
    all percentages based on a resins solids basis, with the total adding to 100 percent.

2. The coating composition of claim 1 wherein said fluoropolymer resin comprises a polyvinylidene fluoride homopolymer or copolymer having at least 75 percent by weight of vinylidene fluoride monomer units.

3. The coating composition of claim 1 comprising from 80 to 90 percent by weight of at least one fluoropolymer resin.

4. The coating composition of claim 3 comprising from 82 to 88 percent by weight of at least one fluoropolymer resin.

5. The coating composition of claim 1 comprising from 5 to 15 percent by weight of at least one acrylic resin.

6. The coating composition of claim 1 comprising from 2 to 10 percent by weight of at least one epoxide resin.

7. The coating composition of claim 1 comprising from 3 to 15 percent by weight of at least one epoxide resin.

8. A coated substrate comprising:
    a) a substrate capable of retaining its shape at a temperature of at least 180° C.; and
    b) a coating composition directly deposited on at least one surface of the substrate, wherein said coating composition comprises
        (1) from 75 to 94 percent by weight of at least one fluoropolymer resin;
        (2) from 5 to 20 percent by weight of at least one acrylic resin;
        (3) from 1 to 15 percent by weight of at least one epoxide resin; and
        (4) from 0.2 to 5 percent by weight of a melamine curing agent,
    all percentages based on a resins solids basis, with the total adding to 100 percent.

9. The coated substrate of claim 8, wherein said substrate comprises a metal, ceramic, marble, glass, china, or brick substrate.

10. The coated substrate of claim 9, wherein said metal substrate is selected from iron, stainless steel, copper, aluminum, and pretreated and non-pretreated galvanized steel.

11. The coated substrate of claim 10, wherein said coated substrate comprises a metal fuel line or brake tube.

* * * * *